(12) United States Patent
Kawasaki et al.

(10) Patent No.: US 6,379,141 B1
(45) Date of Patent: Apr. 30, 2002

(54) ABNORMAL MOLD DETECTOR

(75) Inventors: Hiroaki Kawasaki; Yutaka Hiroshima; Yasuo Ishiwata; Chisato Akinari, all of Mobara (JP)

(73) Assignee: Futaba Denshi Kogyo Kabushiki Kaisha, Mobara (JP)

( * ) Notice: Subject to any disclaimer, the term of this patent is extended or adjusted under 35 U.S.C. 154(b) by 0 days.

(21) Appl. No.: 09/379,572

(22) Filed: Aug. 24, 1999

(30) Foreign Application Priority Data

Aug. 28, 1998 (JP) .......................................... 10-244014

(51) Int. Cl.$^7$ .............................................. B29C 45/40
(52) U.S. Cl. ........................................ 425/139; 425/165
(58) Field of Search ................................ 425/139, 149, 425/165

(56) References Cited

U.S. PATENT DOCUMENTS 3,840,312 A * 10/1974 Paulson et al. ............. 425/149

* cited by examiner

Primary Examiner—Tim Heitbrink
(74) Attorney, Agent, or Firm—Oblon, Spivak, McClelland, Maier & Neustadt, P.C.

(57) ABSTRACT

An abnormal mold detector is provided that can previously detect the breakage of a mold tool with an ejector plate. A pressure sensor is attached to the ejector pin of a mold to detect the mold internal pressure. The operation status of the mold is detected by the sensor attached to the mold piece of the mold. An abnormality detector, formed of a CPU, processes the detected pressure signal and the mold working state indicating signal. The abnormality detector sets a reference value D exceeding a normal sticking resistance of the ejector pin. As a material is injected, the mold internal pressure increases during one cycle (A and B) in the molding step. After the molding process, the ejection process is carried out by the ejector pin during the value C. When a sticking resistance exceeding the value D is confirmed during the monitoring operation (FF), the abnormality detector decides that there may be the possibility that an abnormal state occurs in the mold tool. Thus the abnormality detector issues an alarm signal to the operator to halt the operation of the molding machine.

5 Claims, 7 Drawing Sheets

ABNORMAL MOLD DETECTOR

BACKGROUND OF THE INVENTION

1. Field of the Invention

The present invention relates to an abnormal mold detector that measures the pressure applied on an ejector pin which extrudes a molded item out of a mold tool (or die) and then detects breakage or abnormality of the mold tool.

2. Description of the Prior Art

Figure 9A:
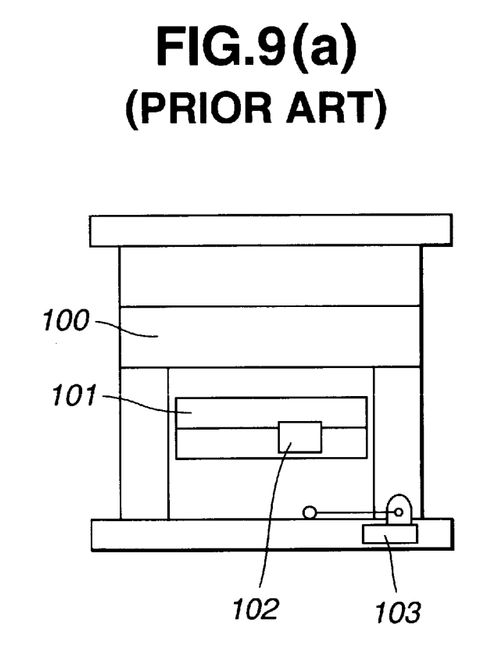
FIGS. 9(a)–9(c) are front views of a conventional molding tool depicted to explain the extraction operation and return operation of an ejector plate.
Figure 9B:
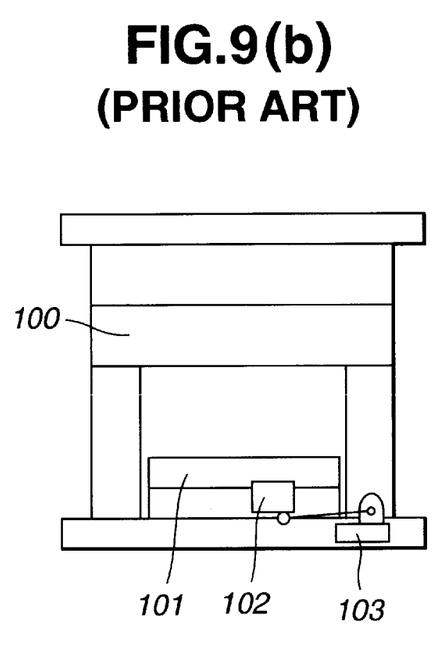
Figure 9C:
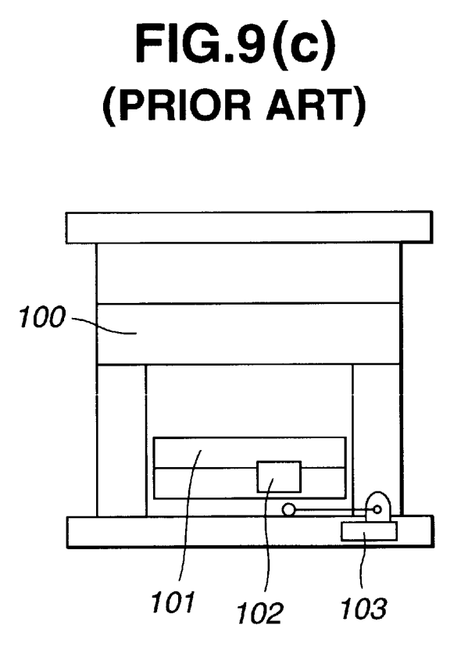

FIGS. 9(a)–9(c) are front views illustrating a mold tool used for a conventional injection molder. Referring to FIGS. 9(a)–9(c), a movable side mold piece 100 with a core is depicted. A fixed side mold piece (not shown) confronts the movable side mold piece 100 and has a cavity. Both the side mold pieces can be opened or closed by moving the movable side mold piece 100 by means of drive means (not shown). An ejector plate 101 is on the side of the movable side mold piece 100 and moves by opening or closing the mold pieces. An ejector pin (not shown) is mounted on the ejector plate 101. The molded item formed by injecting a material between the cavity and the core is ejected out of the mold pieces by pushing the front end of the ejector pin when the mold pieces are parted from each other.

FIG. 9(a) shows the state where the ejector plate 101 is on the side of the movable side mold plate 100 in the mold parting step. In this case, the ejector pin protrudes toward the mold piece side to eject the molded item. The ejector pin 101 is at a normal protruding position. FIG. 9(b) shows that the mold pieces are in a closed state after the ejection step. In this case, the ejector plate 101 is biased to the farthest position from the mold piece by means of a spring. The ejector plate 101 is at a normal return position. The normal return position of the ejector plate 101 is detected by the operation piece 102 attached to the ejector plate 101 and the limit switch 103 attached to the base substrate of the mold piece.

As shown in FIG. 9(a), when the limit switch 103 is turned off in the ejection step (or in a non-operation state), the ejector plate 101 is in a normal state. As shown in FIG. 9(b), when the limit switch 103 is turned on in the ejection step (or in an operation state), the ejector plate 101 is in a normal state. Hence, if the limit switch 103, as shown in FIG. 9(c), is in an off state in the return step, it is judged that there is an abnormal state.

The failure in the return operation of the ejection plate 101 shown in FIG. 9(c) occurs due to various causes. For instance, the failure may occur by a residual substance of the molding substance or the mold lubricant injected into the hole for the ejector pin, a bent ejector pin, a deformed mold tool, or the like. If such a factor increases the sliding resistance against the ejector pin, the ejector pin is further bent, thus resulting in a farther increased sliding resistance. Finally, the ejector pin may be broken or scoring may occur between the ejector pin and the hole, so that the mold pieces cannot be separated from each other.

As described above, the return failure of the ejector plate 101 results from the occurrence of breakage due to scoring between the ejector pin and the hole. Conventionally, the return position is confirmed or detected after the mold tool has been broken. This requires the repair of the mold tool, repairing time and expenses. As described above, the conventional device cannot detect in advance the breakage of mold tools.

SUMMARY OF THE INVENTION

The present invention is made to solve the above-mentioned problems.

Moreover, the objective of the invention is to provide an abnormal mold detector that can previously detect the breakage of a mold tool with an ejector plate.

The objective of the present invention is achieved by an abnormal mold detector suitable for a mold tool (B), said mold tool having a plurality of molding pieces (the fixed side mold piece 12 and the movable side mold piece 13) for forming a molded item and an ejector pin (24, 61) for ejecting said molded item from the plurality of molding pieces when the plurality of molding pieces are separated from each other; said abnormal mold detector comprising pressure detection means (32, indirect pressure sensor 60) for detecting a pressure applied to the ejector pin to output a pressure detection signal; and abnormality detection means (50) for outputting an abnormal detection signal when the pressure applied to the ejector pin exceeds a reference value in a molded item ejection step; whereby a defective mold tool is detected.

According to the present invention, an abnormal mold detector suitable for a mold tool (3), the mold tool having a first mold piece (fixed side mold piece 12) with a cavity, a second mold piece (movable side mold piece 13) having a core and being relatively movable with respect to the first mold piece and an ejector pin (24, 61) for ejecting a molded item out of the first and second mold pieces by pushing it with the front end of the ejector pin when the first mold piece and the second mold piece are relatively separated from each other, the molded item being formed by filling a space between the cavity and the core with a substance, comprises pressure detection means (32, indirect pressure sensor 60) for detecting a pressure applied to the ejector pin to output a pressure detection signal; monitor timing setting means (sensors 52 and 53) for setting a monitor timing where the ejector pin ejects the molded item; processing means (51) for comparing the pressure detection signal with a predetermined reference value in the monitor timing set by the monitor timing setting means and then outputting an abnormal detection signal, in response to an indication from the processing means, when the pressure detection signal exceeds the reference value; whereby a defective mold tool is detected.

In the abnormal mold detector according to the present invention, the monitor timing setting means comprises a sensor (52, 53) mounted on the mold tool to output the timing in the molding step of the mold tool.

In the abnormal mold detector according to the present invention, the monitor timing setting means comprises a sensor (52, 53) mounted on the mold tool to output the timing in the molding step of the mold tool and a timer (timepiece 56) for starting the operation by a trigger signal from the sensor.

In the abnormal mold detector according to the present invention, the reference value is set in plural steps.

In the abnormal mold detector according to the present invention, time intervals for pressure detection of the pressure detection means (32, the indirect pressure sensor 60) are set to a value shorter than the pulse time width of the pressure detection signal applied to the ejector pin (24, 61).

BRIEF DESCRIPTION OF THE DRAWINGS

This and other objects, features, and advantages of the present invention will become more apparent upon a reading of the following detailed description and drawings, in which.

DETAILED DESCRIPTION OF THE PREFERRED EMBODIMENT

Figure 1:
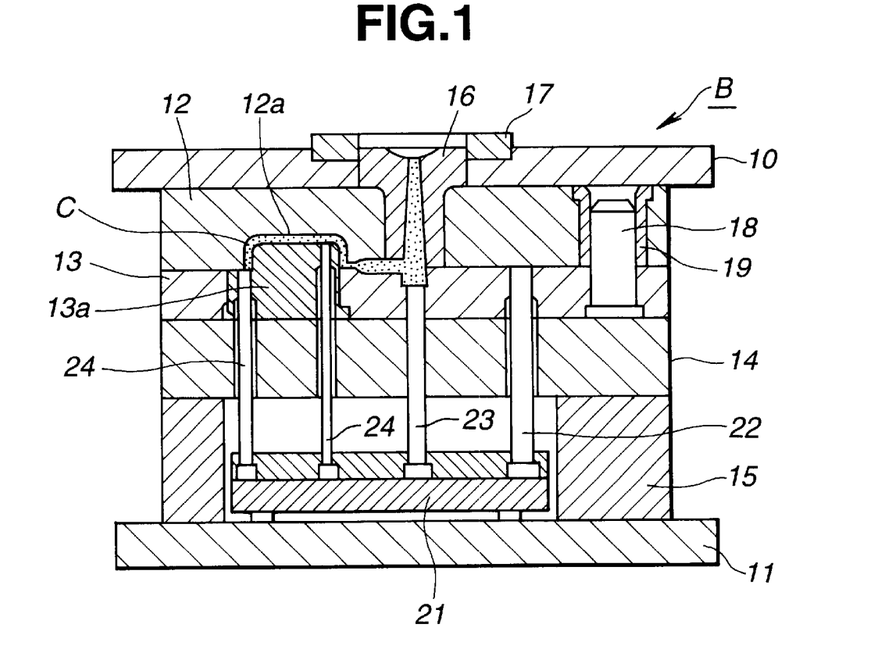
FIG. 1 is a cross-sectional view illustrating a molding tool according to a first embodiment of the present invention.

A first embodiment of the present invention will be described below with reference to FIGS. 1 to 7. FIG. 1 is a cross sectional view illustrating a molding tool (or die) B. The molding tool B has a fixed side mounting plate 10 attached to the fixed side holder of a molding machine and a movable side mounting plate 11 attached to the movable side holder of the molding machine. A fixed side mold piece 12 with a cavity 12a (or a female mold) is attached to the fixed side mounting plate 10. A movable side mold piece 13 with the core 13a (or a male mold) is to the movable side mounting plate 11 via a backing plate 14 and a spacer block 15.

The molding tool B can be divided between the fixed side mold piece 12 and the movable side mold piece 13. As the holder of the molding machine moves, the movable mold piece 13 can move vertically toward the fixed mold piece 12 so as to close or open. A guide bush 19 is inserted into the fixed mold piece 12. A guide post 18 is planted on the movable mold piece 13. The guide post 18 is slidably inserted into the guide bush 19. The fixed mold piece 12 and the movable mold piece 13 are closed or opened by guiding them along the guide bush 19 and the guide post 18. With the fixed mold piece 12 and the movable mold piece 13 closed together, the cavity 12a and the core 13a are positioned at an accurate position.

A sprue 16 acting as the runner trough which molten resin is injected from the cylinder nozzle of the molding machine into the molding tool B and a locating ring 17 (positioning means) for mounting the molding tool B to the cylinder nozzle of the molding machine are mounted to the fixed mounting plate 10.

An ejector plate 21 is mounted on the movable mounting plate 11. An ejector pin 24 with a pressure sensor (hereinafter referred to as an ejector pin) is mounted on the ejector plate 21 to eject the molded item out of the core 13a when the molding tool B is opened. A return pin 22 is mounted to the ejector plate 12 to return the ejector pin 24 to a predetermined position when the molding tool B is closed, thus retracting the ejector pin 24.

Figure 2:
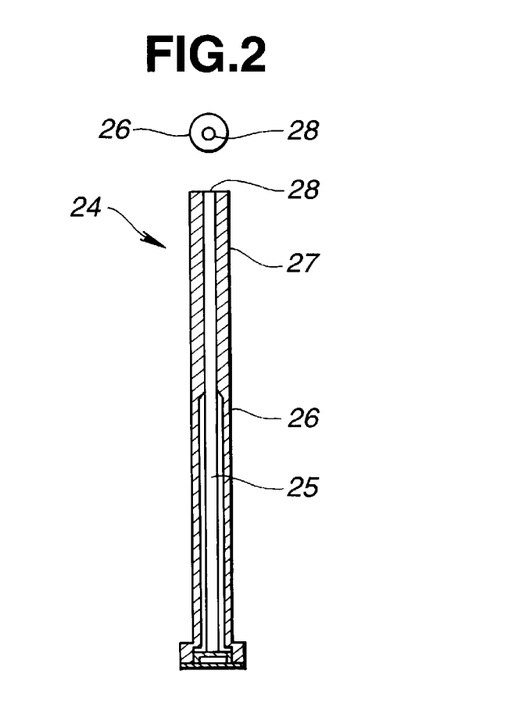
FIG. 2 is a cross-sectional view illustrating an ejector pin according to the first embodiment of the present invention and a plan view illustrating the same.

The ejector pin 24, as shown in FIG. 2, has a round rod 25 for ejecting the molded item with the front end thereof and a sleeve 26 for slidably housing the rod 25. The sleeve 26 has a nearly-uniformed outer diameter but the inner diameter at the upper half portion is different from that at the lower half portion. The upper half portion of the sleeve 26 acts as a guide portion 27 for the rod 25. The inner diameter of the guide portion 27 is nearly equal to the outer diameter of the rod 25. The guide portion 27 guides the rod 25 slidably and axially. The front end of the rod 25 is viewed from the opening 28 of the front end of the guide portion 27 in the cavity 12a. The front end of the rod 25 is substantially flush with the front end of the guide portion 27. The inner diameter of the lower half portion of the sleeve 26 is larger than the outer diameter of the rod 25.

Figure 3:
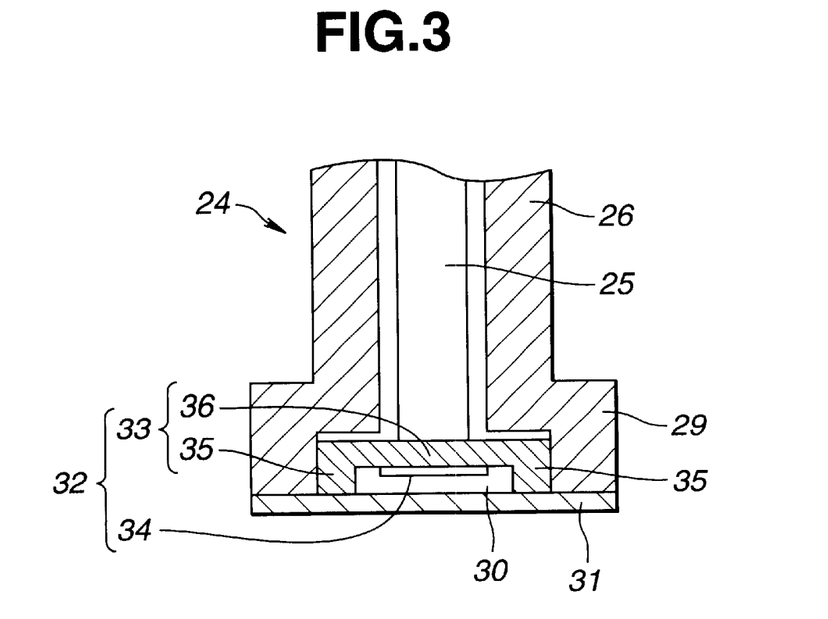
FIG. 3 is an enlarged cross-sectional view illustrating the base portion of an ejector pin according to the first embodiment of the present invention.
Figure 4:
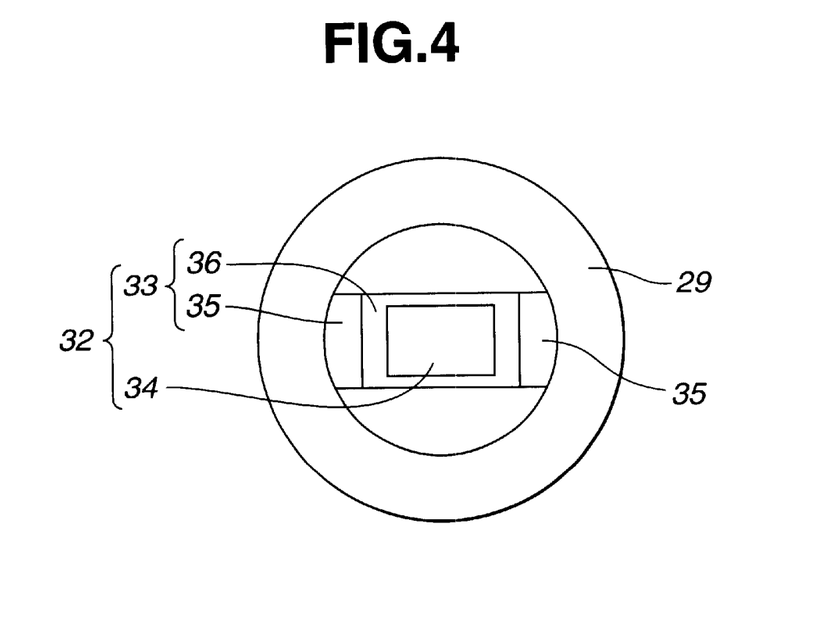
FIG. 4 is a bottom end view illustrating the cover of the base portion of the ejector pin according to the first embodiment of the present invention.

Referring to FIGS. 3 and 4, a step portion 29 is formed at the back end of the sleeve 26. There is a housing room 30 inside the step portion 29. The inner diameter of the housing room 30 is larger than the inner diameter of the lower half portion of the sleeve 26. The open lower surface of the housing room 30 is covered with the disk 31. The pressure detection means 32 securely fixed to the base end of the rod 25 is housed inside the housing room 30. The pressure detection means 32 detects the pressure applied to the front end of the rod 25.

As shown in FIGS. 3 and 4, the pressure detection means 32 consists of a strain producing portion 33 securely fixed to the base end of the rod 25 and a strain sensor 34 acting as a pressure sensor mounted on the strain producing portion 33. The strain producing portion 33 is a part with a U-shaped cross section and has a pair of supporting portions 35 and 35 and a beam 36 bridging the supporting portions 35 and 35. The strain producing portion 33 is in contact with the inner surface of the cover 31 and the side peripheral surfaces of the housing room 30 and is off the upper surface of the beam 36. The base end of the rod 25 is fixed on the upper middle surface of the beam 36. The beam 36 of the strain producing portion 33 is resiliently deformed under the load applied to the rod 25. The load is borne by the supporting portions 35 and 35. The strain producing portion 33 is integrated with a substance with a strength expecting a required safety margin.

As shown in FIGS. 3 and 4, the strain sensor 34 is mounted on the lower middle surface of the beam 36 of the strain producing portion 33. The strain sensor 34 is a sensor for detecting the resilient deformation of the beam 36 of the strain producing portion 33. For instance, an electric-resistance wire strain gauge where the resistance value varies due to a resilient deformation of a resistance wire, thus outputting variations in voltage, may be used as the strain sensor 34. The leads from the strain sensor 34 are externally derived out via the through hole formed in the step portion 29 or the cover 31.

Figure 5:
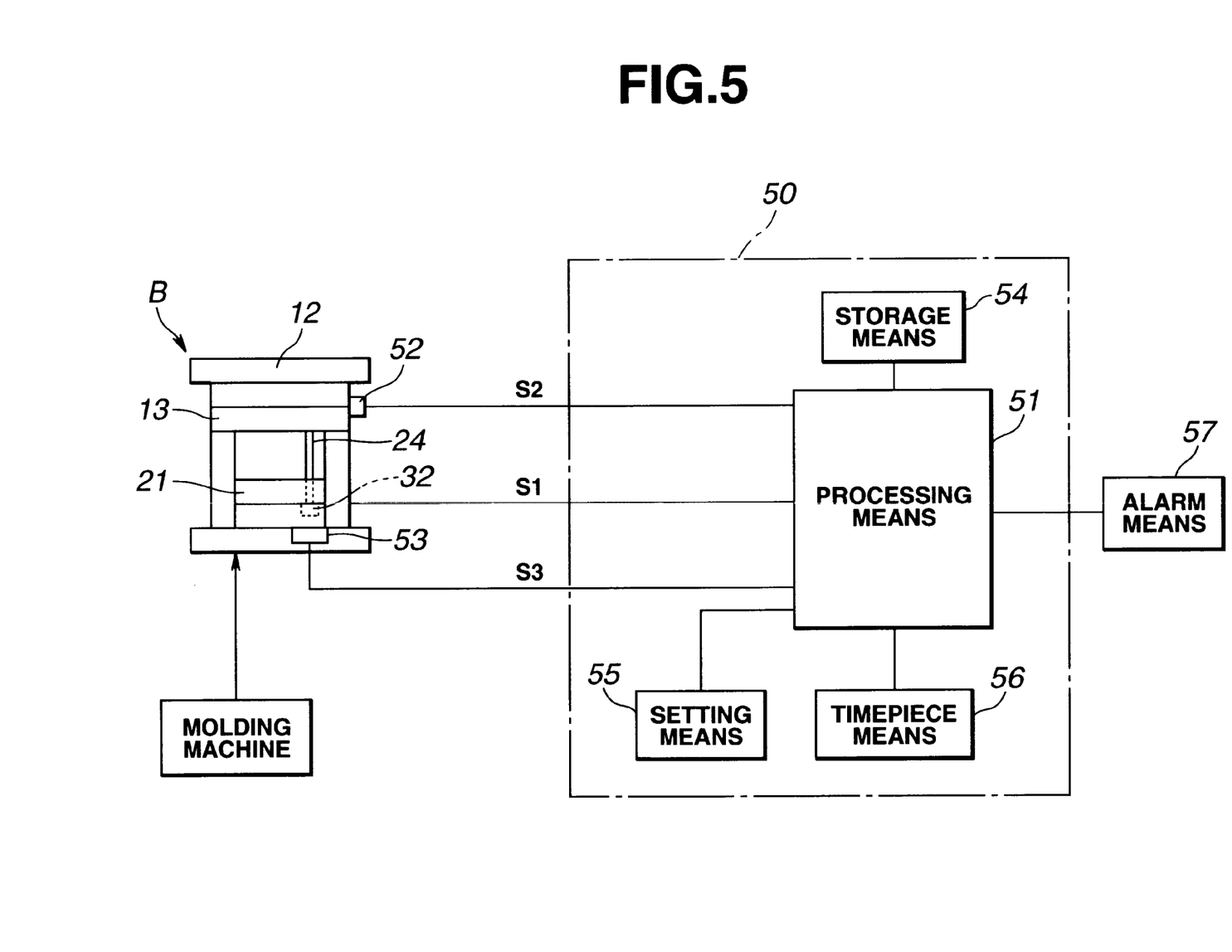
FIG. 5 is a block circuit diagram illustrating the whole configuration of the first embodiment of the present invention.

As shown in FIG. 5, the abnormality detection means 50 is externally mounted to the mold B. The abnormality detection means 50, for instance, may be formed of a CPU. The abnormality detection means 50 has process means 51 that performs arithmetic calculations to check and detect an abnormal state of the mold. Various types of information indicating states of the mold are input to the process means 51. The information includes the pressure detection signal S1 from the pressure detection means 32 of the ejector pin 24 and operation signals S2 and S3 of the mold B from the sensors 52 and 53 (or switches) mounted to the mold. A trigger signal representing an opened mold or closed mold or a trigger signal output when the switch mounted on the parting surface of the mold is turned on or off is used as the operation signal of the mold B. The operation signals S2 and S3 function as monitor timing setting means that sets the monitor timing when the ejector pin ejects the molded item. FIG. 5 shows two routes of trigger signals S2 and S3 representing the operation of the mold tool. However either trigger signal route works for the monitor timing setting means.

The abnormality detection means 50, as shown in FIG. 5, includes storage means 54 for storing the process procedure of the process means 51 and data required for the process. The storage means 54 previously stores data representing the relationships between the output from the strain sensor 34 and the internal pressure of the cavity. The abnormality detection means 50 receives the signal (the pressure detection signal S1) from the strain sensor 34 to detect the internal pressure of the cavity applied to the ejector pin 24. The storage means 54 stores a reference value which is compared with the detection result of the pressure detection means, the sampling time for which the cavity pressure is detected, and the timing data representing the timing at which the sampled pressure is compared with the reference value. The setting means 55 can arbitrarily set the reference value, the sampling time, and the sampling data.

The abnormality detection means, as shown in FIG. 5, has the timepiece means 56 (timer).

The abnormality detection means 50 alarms the abnormal state of the mold tool B to the alarm means 57 (e.g. buzzer or display) according to the judged result and controllably stops the molding machine which drives the mold tools.

The abnormal mold detecting method and procedure of the abnormality detection means 50 will be described below by referring to FIGS. 6 and 7.

When a molten resin is first injected into the cavity in the step of injecting resin into the mold B, the resin pressure is applied to the front end of the ejector pin 24.

In the ejector pin 24, only the area of the front end of the rod 25 of the area of the front end of the ejector pin 24 is a pressure reception area related to the pressure detection. In other words, the annular surface of the front end of the sleeve 25 is not related to the pressure detection. When the resin pressure applied to the front end of the rod 25 provides the downward load to the rod 25, the rod 25 pushes down the beam 36 of the strain producing portion 33. When a load is applied to the nearly middle portion of the upper surface of the beam 36 supported by the supporting portions 35 and 35, the beam 36 is deflected so that the strain sensor 34 produces the signal corresponding to the strain. The abnormality detection means receives the output of the strain sensor 34 and then obtains the load according to the bending moment equation. Thus the internal pressure of the cavity is worked out.

Figure 6:
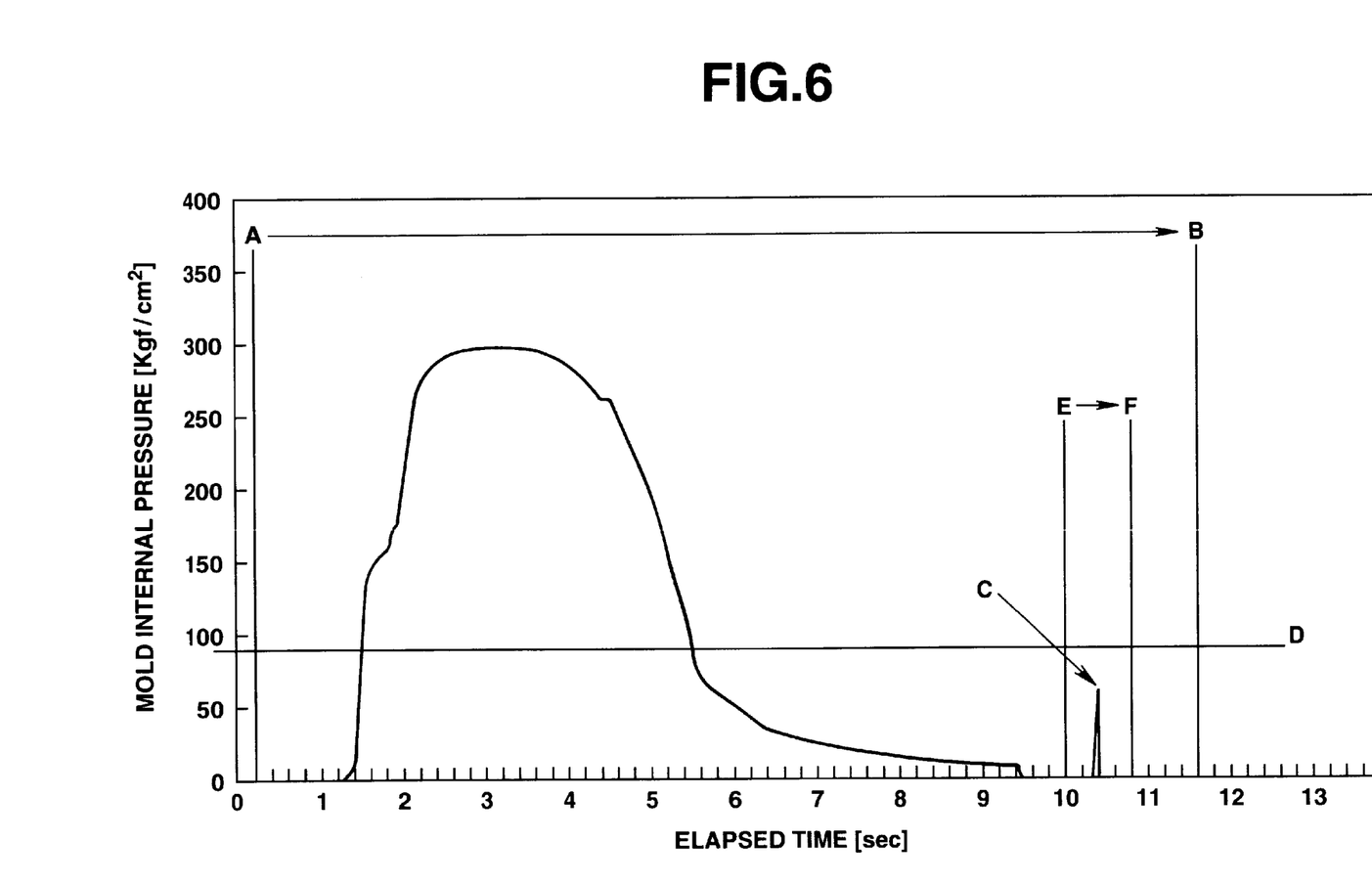
FIG. 6 is a pressure waveform diagram illustrating one cycle (A to B) of a molding process by a normal molding tool according to the first embodiment of the present invention.

FIG. 6 is a diagram illustrating a pressure waveform diagram during one cycle (A to B) in a molding process by the mold tool B. This figure depicts the case where the mold is not in an abnormal state. The Y-axis represents internal pressures of a mold tool whereas the x-axis represents an elapsed time. The mold closure starts at the time A and then ends after about 1.4 seconds. Then, as a material is injected, the internal pressure of the mold increases. After completion of the molding, the mold is opened after about 9.5 seconds. The molded item is ejected with the ejector pin 24 at about 10.5 seconds (C). The sticking (or releasing) resistance to the ejector pin 24 is represented as the pulse waveform (C).

A large value (D) is arbitrarily set based on the sticking resistance at the normal operation. The value (D) is a reference value for judging whether or not an abnormal state occurs in the mold. The pressure detection by the ejector pin 24 is repeated under the control of the abnormality detection means 50 at suitable sampling intervals. The sampling time is set to a value shorter than the time width of the sticking resistance in a pulse form to certainly obtain the sticking resistance pulse waveform. In order to obtain the pulse waveform of the sticking resistance, the timing data representing the timing at which a sampled pressure is compared with the reference value is set. The timing data is data showing the ejection time band of the ejector pin 24 in the mold working step and corresponds to the time range EF in FIG. 6. The reference value D and the timing data (monitoring period EF) are set to a range by considering small variations of the molding machine.

Figure 7:
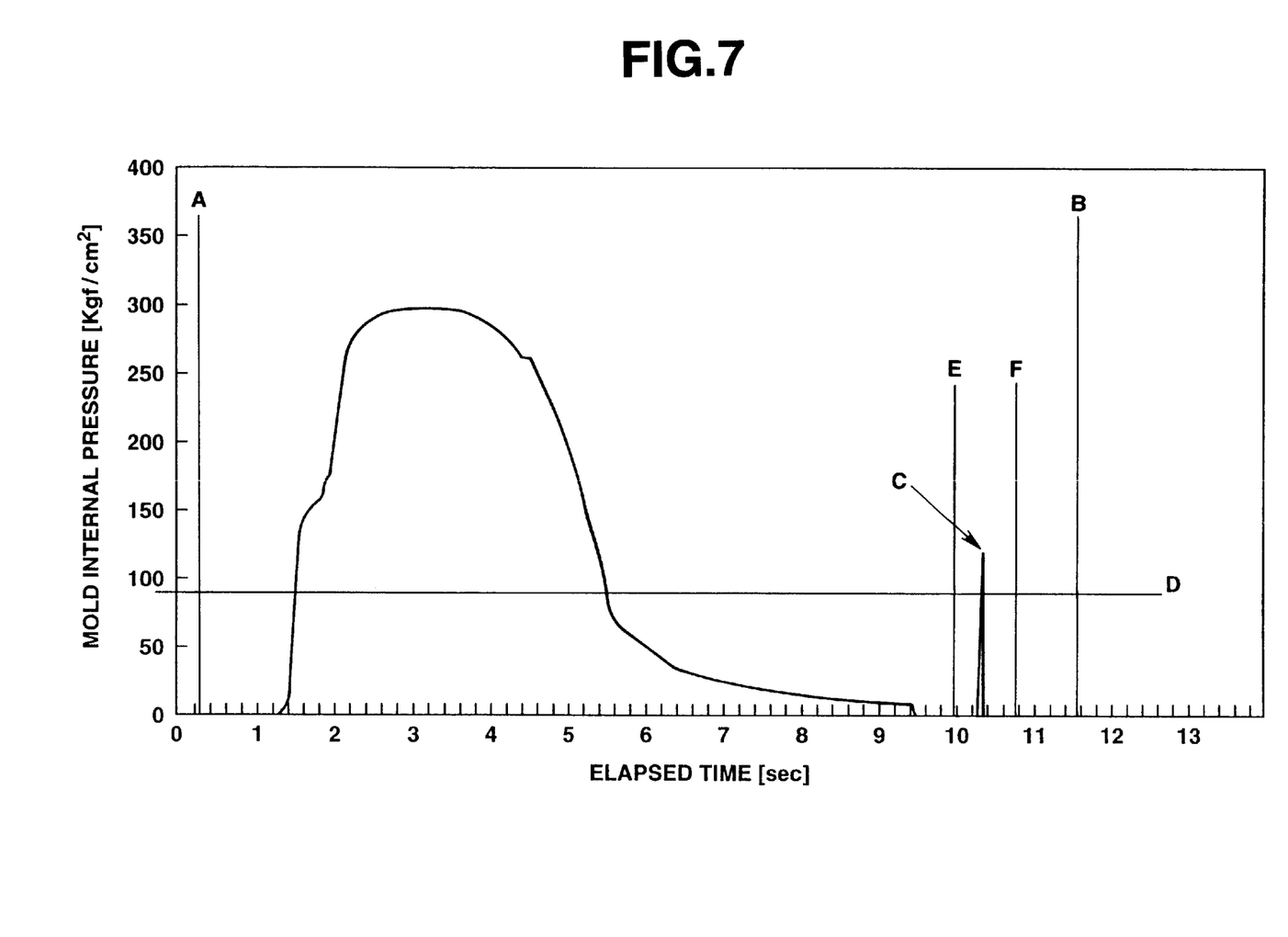
FIG. 7 is a pressure waveform diagram illustrating one cycle (A to B) of a molding process by a defective molding tool according to the first embodiment of the present invention.

FIG. 7 is a pressure waveform during one cycle (A to B) in a molding step by the mold tool B and shows the possibility that an abnormal state may occur in a mold tool (or that the mold tool is in an abnormal state). The sticking resistance is obtained during the monitoring time EF indicated by the timing data. If it is detected that the resistance value exceeds the reference value D, the abnormality detection means 50 produces an operation signal to the alarm means 57 to alarm an operator, thus stopping the operation of the molding machine.

The degree of the abnormal value of the sticking resistance may depend on a failure cause. Hence, when the reference value D is set in plural steps, a different alarm may be issued in each step value. The risk that an abnormality occurs in a step value can be experimentally found.

The following three methods are considered to set the monitoring duration EF. That is, (1) a switch is attached to a mold. The molding machine produces signals in the opening and closing of the mold as trigger signals to set the points E and F. (2) A switch is attached to the parting surface of a mold. The molding machine produces signals in the opening and closing of the mold as trigger signals to set the points E and F. (3) A molding machine produces one trigger signal at the beginning of molding step (mold closing signal). Thus, the timings at the points E and F are set by the timepiece means 56 (timer) in the abnormality detection means 50.

Figure 8:
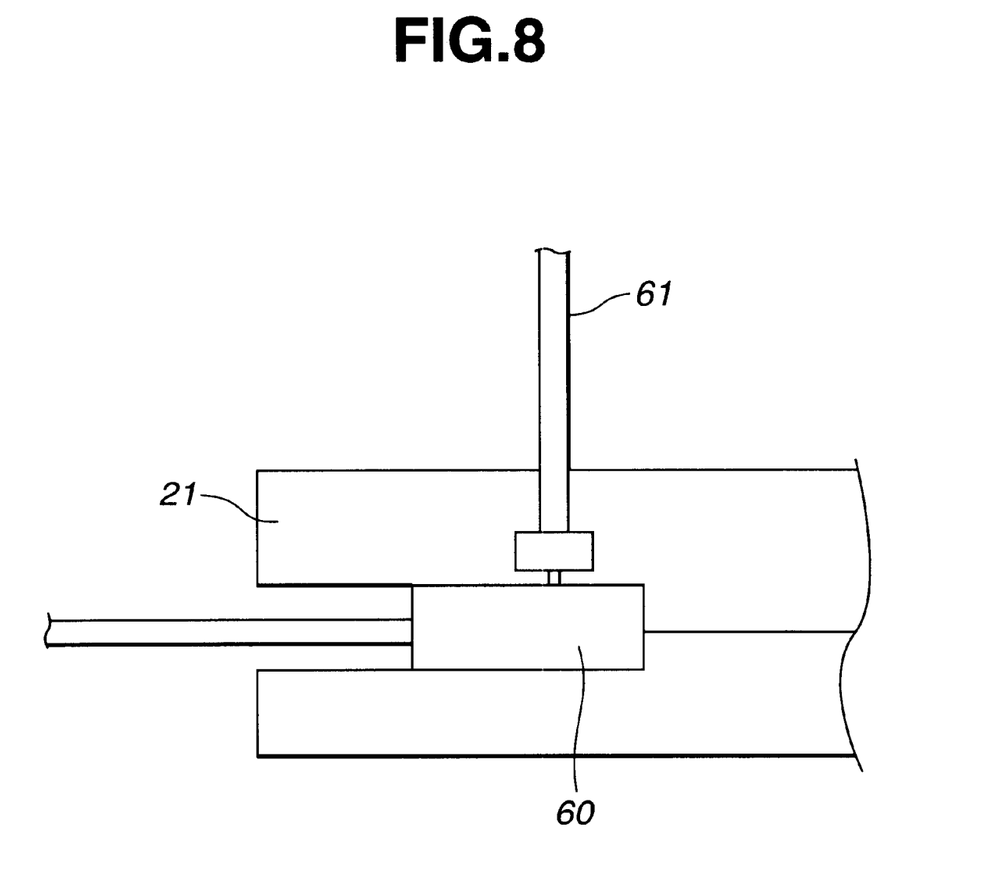
FIG. 8 is a diagram illustrating the structure where a normal ejector pin built in an indirect pressure sensor usable in the present invention is combined with an ejector plate.

In the above-mentioned examples, the ejector pin is built in the pressure sensor. However, the indirect pressure sensor 60 can be combined with the conventional ejector pin 61, as shown in FIG. 8. Furthermore, according to the present invention, a piezoelectric transducer can be used as the pressure sensor. In the above examples, a pressure sensor is built in one ejector pin 24. However, plural ejector pins 24 mounted at different positions can judge to some extent the cause of an abnormal mold based on the position of an abnormal detecting ejector pin.

According to the present invention, the pressure applied to the ejector pin is detected when a molded item is ejected and the mold in a certain abnormal state is judged when the pressure exceeds a reference value. At a result, the occurrence of an abnormal state can be detected before a relatively long, fragile ejector pin is actually broken. In other words, since an abnormal state is detected by possible causes occurring prior to the initial stage of the breakage such as dragging, the damage of a mold can be avoided so that the duration for which the operation resumes after inspection can be minimized. Thus, the inspection timing can be predicted to prevent the breakage of an ejector pin.

What is claimed is:

1. An abnormal mold detector suitable for a mold tool, said mold tool having a plurality of molding pieces for forming a molded item and an ejector pin for ejecting said molded item from said plurality of molding pieces when said plurality of molding pieces are separated from each other; said abnormal mold detector comprising:

pressure detection means for detecting a pressure applied to said ejector pin at a time of ejecting said molded item, to output a pressure detection signal; and abnormality detection means for outputting an abnormal detection signal when the pressure applied to said ejector pin at the time of ejecting said molded item exceeds a reference value in a molded item ejection step;

whereby a defective mold tool is detected.

2. An abnormal mold detector suitable for a mold tool, said mold tool having a first mold piece with a cavity, a second mold piece having a core and being relatively movable with respect to said first mold piece and an ejector pin for ejecting a molded item out of said first and second mold pieces by pushing it with the front end of said ejector pin when said first mold piece and said mold piece are relatively separated from each other, said molded item being formed by filling a space between said cavity and said core with a substance, comprising:

pressure detection means for detecting a pressure applied to said ejector pin at a time of ejecting said molded item, to output a pressure detection signal;

monitor timing setting means for setting a monitor timing at the time when said ejector pin ejects said molded item;

processing means for comparing said pressure detection signal with a predetermined reference value in said monitor timing set by said monitor timing setting means and then outputting an abnormal detection signal, in response to an indication from said process means, when said pressure detection signal exceeds said reference value;

whereby a defective mold tool is detected.

3. The abnormal mold detector defined in claim 2, wherein said monitor timing setting means comprises a sensor mounted on said mold tool to output the timing in the molding step of said mold tool.

4. The abnormal mold detector defined in claim 2, wherein said monitor timing setting means comprises a sensor mounted on said mold tool to output the timing in the molding step of said mold tool and a timer for starting the operation by a trigger signal from said sensor.

5. The abnormal mold detector defined in claim 1, 2, 3 or 4, wherein said reference value is set in plural steps.

* * * * *